United States Patent [19]
Pekala

[11] Patent Number: 6,025,068
[45] Date of Patent: Feb. 15, 2000

[54] INKJET PRINTABLE COATING FOR MICROPOROUS MATERIALS

[75] Inventor: Richard W. Pekala, Allison Park, Pa.

[73] Assignee: PPG Industries Ohio, Inc., Cleveland, Ohio

[21] Appl. No.: 09/023,374

[22] Filed: Feb. 13, 1998

[51] Int. Cl.⁷ ............................... B32B 3/26; B41M 5/00
[52] U.S. Cl. .................. 428/315.5; 427/261; 428/317.7; 428/317.9; 428/319.3; 428/331
[58] Field of Search ............................. 428/315.5, 317.7, 428/317.9, 319.3, 331; 427/261

[56] References Cited

U.S. PATENT DOCUMENTS

| | | | |
|---|---|---|---|
| 4,147,676 | 4/1979 | Pampouchidis | 260/23 TN |
| 4,176,099 | 11/1979 | Pampouchidis et al. | 260/18 TN |
| 4,179,425 | 12/1979 | Pampouchidis et al. | 260/29.6 NR |
| 4,238,594 | 12/1980 | Pampouchidis | 528/69 |
| 4,318,833 | 3/1982 | Guagliardo | 524/457 |
| 4,320,220 | 3/1982 | Pampouchidis | 524/591 |
| 4,395,502 | 7/1983 | Honig et al. | 523/415 |
| 4,937,115 | 6/1990 | Leatherman | 428/36.4 |
| 5,032,450 | 7/1991 | Rechlicz et al. | 428/196 |
| 5,326,391 | 7/1994 | Anderson et al. | 106/409 |
| 5,604,750 | 2/1997 | Romano et al. | 428/304.4 |

*Primary Examiner*—Blaine R. Copenheaver
*Attorney, Agent, or Firm*—George D. Morris

[57] ABSTRACT

A microporous material substrate is coated with a coating composition comprising a volatile aqueous liquid medium and binder dissolved or dispersed in the volatile aqueous liquid medium, wherein the binder comprises film-forming organic polymer comprising: (a) water-soluble poly (ethylene oxide) having a weight average molecular weight in the range of from 100,000 to 3,000,000, and (b) water-soluble or water-dispersible crosslinkable urethane-acrylate hybrid polymer. Finely divided substantially water-insoluble filler particles may optionally be present in the coating composition. After drying and crosslinking, the peel strength between the coating and the microporous material substrate is high. The coating may be inkjet printed. The printed coating may be coated by or laminated to a substantially transparent protective layer.

18 Claims, No Drawings

INKJET PRINTABLE COATING FOR MICROPOROUS MATERIALS

A considerable problem that has arisen from the use of coatings for inkjet printing media is that many of the inks used for inkjet printing coalesce on many of the coatings. There are, unfortunately, many different kinds of inks which are used for inkjet printing, and a coated substrate which performs satisfactorily with inks of one type frequently performs less than satisfactorily with inks of another type.

Another problem that has arisen from the use of coated substrates as inkjet printing media is the long drying time of the water-based inks after they have been applied to the coated substrates.

Coating compositions have now been found which result in coated substrates that eliminate or reduce coalescence of a wide variety of inkjet printing inks when applied to the coated substrate. The coating compositions often provide fast drying times. Accordingly, one embodiment of the invention is a coating composition comprising a volatile aqueous liquid medium and binder dissolved or dispersed in the volatile aqueous liquid medium, wherein the binder comprises film-forming organic polymer comprising: (a) water-soluble poly(ethylene oxide) having a weight average molecular weight in the range of from 100,000 to 3,000,000; and (b) water-soluble or water-dispersible self-crosslinking crosslinkable urethane-acrylate hybrid polymer.

Another embodiment of the invention is a printing medium comprising a microporous material substrate having at least one surface and a coating on the surface, wherein the microporous material substrate on a coating-free, printing ink-free, and impregnant-free basis comprises: (a) a matrix consisting essentially of substantially water insoluble thermoplastic organic polymer, (b) finely divided substantially water-insoluble filler particles, of which at least 50 percent by weight are amorphous precipitated silica particles, the filler particles being distributed throughout the matrix and constituting from 40 to 90 percent by weight of the microporous material, and (c) a network of interconnecting pores communicating substantially throughout the microporous material, the pores constituting from 35 to 95 percent by volume of the microporous material; and wherein the coating comprises binder which comprises organic polymer comprising: (d) poly(ethylene oxide) having a weight average molecular weight in the range of from 100,000 to 3,000,000; and (e) crosslinked urethane-acrylate hybrid polymer. The coating may be substantially nonporous or it may be porous As used herein and in the claims, a coating is substantially nonporous when the pore volume of the coating is less than 0.01 cubic centimeters per gram ($cm^3/g$). Often the pore volume of the coating is less than 0.005 $cm^3/g$. Preferably the pore volume is less than 0.001 $cm^3/g$. Also as used herein and in the claims, the pore volume of the coating is determined using a Micromeritics Model ASAP 2400 Accelerated Surface Area and Porosimetry Instrument (Micromeritics Instrument Corporation) and nitrogen as the adsorbate in accordance with the accompanying operating manual in which the following choices and modifications are followed: (a) samples are prepared by drying for 6 hours under vacuum at ambient room temperature, (b) a dried sample weight of approximately 0.2 gram is used, (c) 40 adsorption points are used, (d) 40 desorption points are used, and (e) the BJH cumulative desorption pore volume of the pores having diameters between 1.7 nanometers and 300 nanometers reported by the instrument is taken as the pore volume.

Yet another embodiment of the invention is a printing process which comprises applying liquid ink droplets to the printing medium of the second embodiment.

The printing media of the invention may be made by coating a surface of a microporous material substrate with the coating composition of the invention and thereafter substantially removing the aqueous liquid medium.

The coating composition can be in the form of an aqueous solution in which case the volatile aqueous liquid medium is a volatile aqueous solvent for the film-forming organic polymer, or the coating composition can be in the form of an aqueous dispersion in which instance the volatile aqueous liquid medium is a volatile aqueous dispersion liquid for at least some of the film-forming organic polymer which is dispersed rather than dissolved in the volatile aqueous dispersion liquid. That portion of the film-forming organic polymer, if any, not dispersed may be dissolved in the volatile aqueous dispersion liquid.

The volatile aqueous liquid medium is predominately water. Small amounts of low boiling volatile water-miscible organic liquids may be intentionally added for particular purposes. Examples of such low boiling volatile water-miscible organic liquids solvents include methanol [CAS 67-56-1], ethanol [CAS 64-17-5], 1-propanol, [CAS 71-23-8], 2-propanol [CAS 67-63-0], 2-butanol [CAS 78-92-2], 2-methyl-2-propanol [CAS 75-65-0], 2-propanone [CAS 67-64-1], and 2-butanone [CAS 78-93-3]. The listing of such liquids is by no means exhaustive.

It is preferred that substantially no low boiling volatile water-miscible organic liquids be intentionally added to the system in order to minimize organic emissions upon drying the coating.

Similarly, water-miscible organic liquids which themselves are of low, moderate, or even negligible volatility may be intentionally added for particular purposes, such as for example, retardation of evaporation. Examples of such organic liquids include 2-methyl-1-propanol [CAS 78-83-1], 1-butanol [CAS 71-36-3], 1,2-ethanediol [CAS 107-21-1], and 1,2,3-propanetriol [CAS 56-81-5]. The listing of such liquids is by no means exhaustive.

It is preferred that substantially no water-miscible organic liquids which are of low, moderate, or negligible volatility be intentionally added to the system.

Notwithstanding the above, those materials which, although not intentionally added for any particular purpose, are normally present as impurities in one or more of the components of the coating compositions of the invention and which become components of the volatile aqueous liquid medium, may be present in low concentrations.

In most instances water constitutes at least 80 percent by weight of the volatile aqueous liquid medium. Often water constitutes at least 95 percent by weight of the volatile aqueous liquid medium. Preferably water constitutes substantially all of the volatile aqueous liquid medium.

The amount of volatile aqueous liquid medium present in the coating composition may vary widely. The minimum amount is that which will produce a coating composition having a viscosity low enough to apply as a coating. The maximum amount is not governed by any theory, but by practical considerations such as the cost of the liquid medium, the minimum desired thickness of the coating to be deposited, and the cost and time required to remove the volatile aqueous liquid medium from the applied wet coating. Usually, however, the volatile aqueous liquid medium constitutes from 75 to 98 percent by weight of the coating composition. In many cases the volatile aqueous liquid medium constitutes from 85 to 98 percent by weight of the coating composition. Often the volatile aqueous liquid medium constitutes from 86 to 96 percent by weight of the coating composition. Preferably the volatile aqueous liquid medium constitutes from 88 to 95 percent by weight of the composition.

Water-soluble poly(ethylene oxide) having a weight average molecular weight in the range of from 100,000 to 3,000,000 is known. Such materials are ordinarily formed by polymerizing ethylene oxide [CAS 75-21-8], usually in the presence of a small amount of an initiator such as low molecular weight glycol or triol. Examples of such initiators include ethylene glycol [CAS 107-21-1], diethylene glycol [CAS 111-46-6], triethylene glycol [CAS 112-27-6], tetraethylene glycol [CAS 112-60-7], propylene glycol [CAS 57-55-6], trimethylene glycol [CAS 504-63-2], dipropylene glycol [CAS 110-98-5], glycerol [CAS 56-81-5], trimethylolpropane [CAS 77-99-6], and α,ω-diaminopoly(propylene glycol) [CAS 9046-10-0]. One or more other lower alkylene oxides such as propylene oxide [CAS 75-56-9] and trimethylene oxide [CAS 503-30-0] may also be employed as comonomer with the ethylene oxide, whether to form random polymers or block polymers, but they should be used only in those small amounts as will not render the resulting polymer both water-insoluble and nondispersible in water. As used herein and in the claims, the term "poly(ethylene oxide)" is intended to include the foregoing copolymers of ethylene oxide with small amounts of lower alkylene oxide, as well as homopolymers of ethylene oxide. The configuration of the polyethylene oxide) can be linear, branched, comb, or star-shaped. The preferred terminal groups of the poly(ethylene oxide) are hydroxyl groups, but terminal lower alkoxy groups such as methoxy groups may be present provided their types and numbers do not render the poly (ethylene oxide) polymer unsuitable for its purpose. In most cases the poly(ethylene oxide) having a weight average molecular weight in the range of from 100,000 to 3,000,000 is water-soluble. The preferred poly(ethylene oxide) having a weight average molecular weight in the range of from 100,000 to 3,000,000 is a water-soluble homopolymer of ethylene oxide produced using a small amount of ethylene glycol as an initiator.

The weight average molecular weight of the water-soluble poly(ethylene oxide) is in the range of from 100,000 to 3,000,000. Often the weight average molecular weight of the water-soluble poly(ethylene oxide) is in the range of from 150,000 to 1,000,000. Frequently the weight average molecular weight of the water-soluble poly(ethylene oxide) is in the range of from 200,000 to 1,000,000. From 300,000 to 700,000 is preferred.

The amount of the water-soluble poly(ethylene oxide) having a weight average molecular weight in the range of from 100,000 to 3,000,000 present in the organic polymer of the binder may vary considerably. Usually the water-soluble poly(ethylene oxide) having a weight average molecular weight in the range of from 100,000 to 3,000,000 constitutes from 20 to 80 percent by weight of the organic polymer of the binder. Generally the water-soluble poly(ethylene oxide) having a weight average molecular weight in the range of from 100,000 to 3,000,000 constitutes from 30 to 70 percent by weight of the organic polymer of the binder. From 40 to 60 percent by weight of the organic polymer of the binder is preferred.

Water-soluble or water-dispersible self-crosslinking crosslinkable urethane-acrylate hybrid polymers are themselves known. Many examples of such polymers are given in the following United States Patents, the entire disclosures of which are incorporated herein by reference: U.S. Pat. No. 4,147,676, U.S. Pat. No. 4,176,099, U.S. Pat. No. 4,179,425, U.S. Pat. No. 4,238,594, U.S. Pat. No. 4,320,220, and U.S. Pat. No. 4,395,502. Such urethane-acrylate hybrid polymers are self-crosslinking in that they crosslink through heat polymerization of alpha, beta-unsaturated double bonds. No external crosslinking agent is necessary to crosslink the polymer, although one or more external crosslinking agents may be present when desired.

Examples of self-crosslinking crosslinkable urethane-acrylate hybrid polymers include the reaction products of diepoxy compounds with alpha, beta-unsaturated acids and, optionally long chain fatty acids, and basic monoisocyanates, as described in U.S. Pat. No. 4,238,594. Other examples include reaction products of diepoxy compounds with monoamines, and optionally fatty acids, and unsaturated monoisocyanates, as described in U.S. Pat. No. 4,320,220. Still other examples include two moles of a diepoxy compound plus one mole of a primary-tertiary or secondary-secondary diamine plus two moles of an alpha, beta-unsaturated monocarboxylic acid, and optionally an unsaturated fatty acid, plus an unsaturated monoisocyanate, as described in U.S. Pat. No. 4,147,676. Yet other examples include the basic polyurethane compounds containing ethylenic double bonds wherein one mole of an aromatic, cycloaliphatic, or aliphatic polyisocyanate is reacted with at least one mole of a dialkylalkanolamine and the remaining isocyanato groups are reacted stepwise or simultaneously with the corresponding quantity of a monohydroxyalkyl (meth)acrylate and/or monohydroxyalkyloxy(meth)acrylate and/or monohydroxyallylether of a polyol, and optionally, with a saturated and/or an unsaturated monoalcohol and/or a saturated and/or unsaturated fatty acid, as described in U.S. Pat. No. 4,179,425. Other examples include one or more of the self-crosslinking resins described in U.S. Pat. No. 4,238,594, U.S. Pat. No. 4,320,220, and/or U.S. Pat. No. 4,147,676, in admixture with one or more of the self-crosslinking binders described in U.S. Pat. No. 4,179,425, all as described in U.S. Pat. No. 4,176,099. Further examples include one or more of the self-crosslinking resins described in U.S. Pat. No. 4,238,594, U.S. Pat. No. 4,320,220, and/or U.S. Pat. No. 4,147,676, in admixture with one or more of the di- and/or triurethanes described in U.S. Pat. No. 4,395, 502, all as described in U.S. Pat. No. 4,395,502. Still further examples include the reaction product of (A) a resin carrying reactive amine groups and reactive hydroxyl or carboxyl groups or mixture thereof, and (B) a sufficient amount to render the coating composition water dilutable when reacted with an acid, of a reaction product carrying one free isocyanate group of an aromatic or aliphatic or cycloaliphatic polyisocyanate or mixture thereof and an alpha, beta-ethylenically unsaturated monomer carrying at least one isocyanate reactive hydrogen atom and the group represented by the formula:

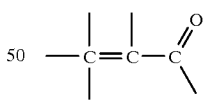

as described in U.S. Pat. No. 4,320,220. The foregoing are exemplary only; other water-soluble or water-dispersible self-crosslinking urethane-acrylate hybrid polymers may be used as desired.

The amount of the water-soluble or water-dispersible urethane-acrylate hybrid polymer present in the organic polymer of polymer of the binder may vary widely. Usually the water-soluble or water-dispersible urethane-acrylate hybrid polymer constitutes from 20 to 80 percent by weight of the organic polymer of the binder. Frequently water-soluble or water-dispersible urethane-acrylate hybrid polymer constitutes from 30 to 70 percent by weight of the organic polymer of the binder. From 40 to 60 percent by weight of the organic polymer of the binder is preferred.

The film-forming organic polymer of the binder of the coating composition may optionally also comprise additional organic polymer other than water-soluble poly (ethylene oxide) having a weight average molecular weight in the range of from 100,000 to 3,000,000 and the water-soluble or water-dispersible urethane-acrylate hybrid polymer. Such additional organic polymer may be (1) one or more film-forming additional organic polymers, (2) one or more additional organic polymers which by themselves are not film-forming provided their identities and amounts do not preclude the total organic polymer of the binder of the coating composition from being film-forming, or (3) a mixture of both one or more film-forming additional organic polymers and one or more additional organic polymers which are not film-forming provided that the identities and amounts of the organic polymers which are not film-forming do not preclude the total organic polymer of the binder of the coating composition from being film-forming.

Examples of film-forming additional organic polymers include, but are not limited to, water-soluble poly(ethylene oxide) having a weight average molecular weight below 100,000, water-soluble poly(ethylene oxide) having a weight average molecular weight above 3,000,000, water-soluble cellulosic organic polymers, water-soluble noncellulosic organic polymers, water dispersible polymers such as poly(ethylene-co-acrylic acid), or a mixture of two or more thereof.

There are many widely varying types of water-soluble cellulosic organic polymers which may be employed in the present invention. Of these, the water-soluble cellulose ethers are preferred water-soluble cellulosic organic polymers. Many of the water-soluble cellulose ethers are also excellent water retention agents. Examples of the water-soluble cellulose ethers include water-soluble methylcellulose [CAS 9004-67-5], water-soluble carboxymethylcellulose, water-soluble sodium carboxymethylcellulose [CAS 9004-32-4], water-soluble ethylmethylcellulose, water-soluble hydroxyethylmethylcellulose [CAS 9032-42-2], water-soluble hydroxypropylmethylcellulose [CAS 9004-65-3], water-soluble hydroxyethylcellulose [CAS 9004-62-0], water-soluble ethylhydroxyethylcellulose, water-soluble sodium carboxymethylhydroxyethylcellulose, water-soluble hydroxypropylcellulose [CAS 9004-64-2], water-soluble hydroxybutylcellulose [CAS 37208-08-5], water-soluble hydroxybutylmethylcellulose [CAS 9041-56-9] and water-soluble cellulose sulfate sodium salt [CAS 9005-22-5]. Water-soluble hydroxypropylcellulose is preferred.

Water-soluble hydroxypropylcellulose is a known material and is available commercially in several different weight average molecular weights. The weight average molecular weight of the water-soluble hydroxypropylcellulose used in the present invention can vary widely, but usually it is in the range of from 100,000 to 1,000,000. Often the weight average molecular weight is in the range of from 100,000 to 500,000. From 200,000 to 400,000 is preferred. Two or more water-soluble hydroxypropylcelluloses having different weight average molecular weights may be admixed to obtain a water-soluble hydroxypropyl cellulose having a differing weight average molecular weight.

Similarly, there are many widely varying kinds of water-soluble noncellulosic organic polymers which may be employed in the present invention. Examples of the water-soluble noncellulosic organic polymers include water-soluble poly(vinyl alcohol), water-soluble poly (vinylpyrrolidone), water-soluble poly(vinylpyridine), water-soluble poly(ethylene oxide), water-soluble poly (ethylenimine), water-soluble ethoxylated poly (ethylenimine), water-soluble poly(ethylenimine) epichlorohydrin, water-soluble polyacrylate, water-soluble sodium polyacrylate, water-soluble poly(acrylamide), water-soluble carboxy modified poly(vinyl alcohol), water-soluble poly(2-acrylamido-2-methylpropane sulfonic acid), water-soluble poly(styrene sulfonate), water-soluble vinyl methyl ether/maleic acid copolymer, water-soluble styrene-maleic anhydride copolymer, water-soluble ethylenemaleic anhydride copolymer, water-soluble acrylamide/acrylic acid copolymer, water-soluble poly(diethylene triamine-co-adipic acid), water-soluble poly[(dimethylamino)ethyl methacrylate hydrochloride], water-soluble quaternized poly(imidazoline), water-soluble poly(N,N-dimethyl-3,5-dimethylene piperidinium chloride), poly (dimethyldiallylammonium chloride), poly (vinylbenzyltrimethylammonium chloride), water-soluble poly(vinylpyridinium halide), water-soluble poly [(methacryloyloxyethyl)(2-hydroxyethyl) dimethylammonium chloride], water-soluble poly (alkylenepolyaminedicyandiamide ammonium condensate), water-soluble poly((meth)acrylamidealkyl quaternary salts, water-soluble starch, water-soluble oxidized starch, water-soluble cationized starch, water-soluble casein, water-soluble gelatin, water-soluble sodium alginate, water-soluble carrageenan, water-soluble dextran, water-soluble gum arabic, water-soluble pectin, water-soluble albumin, and water-soluble agar-agar. Water-soluble poly(vinyl alcohol) is preferred.

Water-soluble poly(vinyl alcohol) may be broadly classified as one of two types. The first type is fully hydrolyzed water-soluble poly(vinyl alcohol) in which less than 1.5 mole percent acetate groups are left on the molecule. The second type is partially hydrolyzed water-soluble poly(vinyl alcohol) in which from 1.5 to as much as 20 mole percent acetate groups are left on the molecule. The water-soluble organic polymer may comprise either type or a mixture of both.

Examples of water-soluble polyacrylates which can advantageously be used include the water-soluble anionic polyacrylates and the water-soluble cationic polyacrylates. Water-soluble anionic polyacrylates are themselves well known. Usually, but not necessarily, they are copolymers of one or more (meth)acrylic esters and enough (meth)acrylic acid and/or (meth)acrylic acid salt to provide sufficient carboxylate anions to render the polymer water-soluble. Similarly, water-soluble cationic polyacrylates are themselves well known. Usually, but not necessarily, they are copolymers of one or more (meth)acrylic esters and enough amino-functional ester of (meth)acrylic acid to provide sufficient ammonium cations to render the acrylic polymer water-soluble. Such ammonium cations may be primary, secondary, tertiary, or quaternary. Usually the water-soluble cationic polyacrylate is a primary, secondary, tertiary, or quaternary ammonium salt, or it is a quaternary ammonium hydroxide.

When optional additional organic polymer is present in the binder, it usually constitutes from 1 to 60 percent by weight of the organic polymer of the binder. Frequently the optional additional organic polymer constitutes from 1 to 40 percent by weight of the organic polymer of the binder. In many cases the optional additional organic polymer constitutes from 1 to 20 percent by weight of the organic polymer of the binder. Often the optional additional organic polymer constitutes from 1 to 10 percent by weight of the organic polymer of the binder. Frequently the optional additional organic polymer, when present, constitutes from 3 to 8 percent by weight of the organic polymer of the binder.

The amount of film-forming organic polymer of the coating composition constitutes from 20 to 100 percent by weight of the solids of the coating composition. In many cases the film-forming organic polymer constitutes from 40 to 80 percent by weight of the solids of the coating composition. From 50 to 75 percent by weight is preferred.

Similarly, the amount of organic polymer of the binder of the coating constitutes from 20 to 100 percent by weight of the coating. Often the organic polymer of the binder constitutes from 40 to 80 percent by weight of the coating. From 50 to 75 percent by weight is preferred.

Finely divided substantially water-insoluble filler particles may optionally be present in the coating composition and the coating. The finely divided substantially water-insoluble filler particles may be finely divided substantially water-insoluble inorganic filler particles, finely divided substantially water-insoluble thermoset organic particles, finely divided substantially water-insoluble nonfilm-forming thermoplastic organic polymer particles, or a mixture thereof.

The finely divided substantially water-insoluble inorganic filler particles which may optionally be present are often finely divided substantially water-insoluble particles of metal oxide. The metal oxide constituting the particles may be a simple metal oxide (i.e., the oxide of a single metal) or it may be a complex metal oxide (i.e., the oxide of two or more metals). The particles of metal oxide may be particles of a single metal oxide or they may be a mixture of different particles of different metal oxides.

Examples of suitable metal oxides include alumina, silica, and titania. Other oxides may optionally be present in minor amount. Examples of such optional oxides include, but are not limited to, zirconia, hafnia, and yttria. Other metal oxides that may optionally be present are those which are ordinarily present as impurities such as for example, iron oxide. For purposes of the present specification and claims, silicon is considered to be a metal.

When the particles are particles of alumina, most often the alumina is alumina monohydroxide. Particles of alumina monohydroxide, AlO(OH), and their preparation are known. The preparation and properties of alumina monohydroxide are described by B. E. Yoldas in *The American Ceramic Society Bulletin*, Vol. 54, No. 3, (March 1975), pages 289–290, in *Journal of Applied Chemical Biotechnology*, Vol. 23 (1973), pages 803–809, and in *Journal of Materials Science*, Vol. 10 (1975), pages 1856–1860. Briefly, aluminum isopropoxide or aluminum secondary-butoxide are hydrolyzed in an excess of water with vigorous agitation at from 75° C. to 80° C. to form a slurry of aluminum monohydroxide. The aluminum monohydroxide is then peptized at temperatures of at least 80° C. with an acid to form a clear alumina monohydroxide sol which exhibits the Tyndall effect when illuminated with a narrow beam of light. Since the alumina monohydroxide of the sol is neither white nor colored, it is not a pigment and does not function as a pigment in the present invention. The acid employed is noncomplexing with aluminum, and it has sufficient strength to produce the required charge effect at low concentration. Nitric acid, hydrochloric acid, perchloric acid, acetic acid, chloroacetic acid, and formic acid meet these requirements. The acid concentration is usually in the range of from 0.03 to 0.1 mole of acid per mole of aluminum alkoxide. Although it is desired not to be bound by any theory, it is believed that the alumina monohydroxide produced in this manner is pseudo-boehmite. Pseudo-boehmite is indeed the preferred alumina monohydroxide for use in the present invention. The alumina monohydroxide is not a pigment and does not function as a pigment in the present invention. In most instances the alumina monohydroxide is transparent and colorless.

Colloidal silica is also known. Its preparation and properties are described by R. K. Iler in *The Chemistry of Silica*, John Wiley & Sons, Inc., New York (1979) ISBN 0-471-02404-X, pages 312–337, and in U.S. Pat. Nos. 2,601,235; 2,614,993; 2,614,994; 2,617,995; 2,631,134; 2,885,366; and 2,951,044, the disclosures of which are, in their entireties, incorporated herein by reference. Examples of commercially available colloidal silica include Ludox® HS, LS, SM, TM and CL-X colloidal silica (E. I. du Pont de Nemours & Company, Inc.) in which the counter ion is the sodium ion, and Ludox® AS colloidal silica (E. I. du Pont de Nemours & Company, Inc.) in which the counter ion is the ammonium ion. Another example is Ludox® AM colloidal silica (E. I. du Pont de Nemours & Company, Inc.) in which some of the silicon atoms have been replaced by aluminum atoms and the counter ion is the sodium ion.

Colloidal titania is also known. Its preparation and properties are described in U.S. Pat. No. 4,275,118. Colloidal titania may also be prepared by reacting titanium isopropoxide [CAS 546-68-9] with water and tetramethyl ammonium hydroxide.

Finely divided substantially water-insoluble thermoset organic filler particles may optionally be present. Thermoset organic polymer is organic polymer crosslinked at least to the extent that it cannot be significantly softened or remelted by heat. Examples of such thermoset organic polymers include thermoset melamine-aldehyde polymer, thermoset resorcinol-aldehyde polymer, thermoset phenolresorcinol-aldehyde polymer, thermoset (meth)acrylate polymer, and thermoset styrene-divinylbenzene polymer.

The finely divided substantially water-insoluble nonfilm-forming thermoplastic organic polymer particles which may optionally be present are thermoplastic in that they may be softened and/or melted at elevated temperatures. Nevertheless they are nonfilm-forming when used in accordance with this invention. Examples of suitable finely divided substantially water-insoluble nonfilm-forming thermoplastic organic polymer particles include polyethylene particles such as those contained in Poly Emulsion 316N30 sol (ChemCor Inc., Chester, N.Y.), maleated polypropylene particles such as those contained in Poly Emulsion 43C30 sol (ChemCor Inc., Chester, N.Y.), and polyacrylate, polymethacrylate, polystyrene, and/or fluoropolymer particles made by microemulsion processes.

The filler particles usually have a maximum dimension of less than 500 nanometers. Often the filler particles have a maximum dimension of less than 100 nanometers. Frequently the maximum dimension is less than 50 nanometers. Preferably the maximum dimension is less than 20 nanometers.

As used herein and in the claims the maximum dimension of the filler particles is determined by transmission electron microscopy.

The finely divided substantially water-insoluble filler particles usually constitute from 0 to 80 percent by weight of the coating or of the solids of the coating composition. In many cases the finely divided substantially water-insoluble filler particles constitute from 20 to 60 percent by weight of the coating or of the solids of the coating composition. From 25 to 50 percent by weight is preferred. As used herein and in the claims, "solids of the coating composition" is the residue remaining after the solvent and any other volatile materials have been substantially removed from the coating composition by drying to form a coating in accordance with good coatings practice.

The finely divided substantially water-insoluble filler particles having a maximum dimension of less than 500 nanometers and the binder together usually constitute from 2 to 25 percent by weight of the coating composition. Frequently such particles and the binder together constitute from 2 to 15 percent by weight of the coating composition. Often such particles and the binder together constitute from 4 to 14 percent by weight of the coating composition. Preferably such particles and the binder together constitute from 5 to 12 percent by weight of the coating composition.

A material which may optionally be present in the coating composition is surfactant. For purposes of the present specification and claims surfactant is considered not to be a part of the organic film-forming polymer of the binder. There are many available surfactants and combinations of surfactants which may be used. Examples of suitable surfactants include, but are not limited to, Fluorad® FC-170-C surfactant (3M Company), and Triton® X-405 surfactant (Union Carbide Corporation).

When used, the amount of surfactant present in the coating composition may vary considerably. In such instances the weight ratio of the surfactant to the poly (ethylene oxide) having a weight average molecular weight in the range of from 100,000 to 3,000,000 is usually in the range of from 0.01:100 to 10:100. In many instances the weight ratio is in the range of from 0.1:100 to 10:100. Often the weight ratio is in the range of from 0.2:100 to 5:100. From 0.5:100 to 2:100 is preferred. These ratios are on the basis of surfactant dry solids and poly(ethylene oxide) dry solids.

There are many other conventional adjuvant materials which may optionally be present in the coating composition. These include such materials as lubricants, waxes, plasticizers, antioxidants, organic solvents, lakes, and pigments. The listing of such materials is by no means exhaustive. These and other ingredients may be employed in their customary amounts for their customary purposes so long as they do not seriously interfere with good coating composition formulating practice.

The pH of the coating composition may vary considerably. In most instances the pH is in the range of from 3 to 10. Often the pH is in the range of from 3.5 to 7. In other instances the pH is in the range of from 7 to 9.

The coating compositions are usually prepared by simply admixing the various ingredients. The ingredients may be mixed in any order. Although the mixing of liquid and solids is usually accomplished at room temperature, elevated temperatures are sometimes used. The maximum temperature which is usable depends upon the heat stability of the ingredients.

The coating compositions are generally applied to the surface of the microporous material substrate using any conventional technique known to the art. These include spraying, curtain coating, dipping, rod coating, blade coating, roller application, size press, printing, brushing, drawing, slot-die coating, and extrusion. The coating is then formed by removing the solvent from the applied coating composition. This may be accomplished by any conventional drying technique. Coating composition may be applied once or a multiplicity of times. When the coating composition is applied a multiplicity of times, the applied coating is usually but not necessarily dried, either partially or totally, between coating applications. Once the coating composition has been applied to the substrate, the solvent is substantially removed, usually by drying.

The thickness of the substantially dry coating may vary widely, but in most instances the thickness of the coating is in the range of from 1 to 40 µm. In many cases the thickness of the coating is in the range of from 5 to 25 µm. Often the thickness is in the range of from 5 to 15 µm.

Many microporous materials based on water insoluble thermoplastic organic polymer and particulate filler are known and may be employed as the microporous material substrate in the present invention. Examples of such microporous materials, processes for making such microporous materials, and their properties are described in U.S. Pat. Nos. 2,772,322; 3,351,495; 3,696,061; 3,725,520; 3,862,030; 3,903,234; 3,967,978; 4,024,323; 4,102,746; 4,169,014; 4,210,709; 4,226,926; 4,237,083; 4,335,193; 4,350,655; 4,472,328; 4,585,604; 4,613,643; 4,681,750; 4,791,144; 4,833,172; 4,861,644; 4,892,779; 4,927,802; 4,872,779; 4,927,802; 4,937,115; 4,957,787; 4,959,208; 5,032,450; 5,035,886; 5,071,645; 5,047,283; and 5,114,438, in U.S. patent application Ser. No. 07/596,175, filed Oct. 10, 1990, and in International Publication No. WO 92/06577. The processes for making the known microporous materials may be modified by using amorphous precipitated silica having a low extractable alkali metal content as all or a substantial proportion of the filler used to form the microporous material in accordance with the teachings of the present invention.

The matrix of the microporous material consists essentially of substantially water-insoluble thermoplastic organic polymer. The numbers and kinds of such polymers suitable for use of the matrix are enormous. In general, substantially any substantially water-insoluble thermoplastic organic polymer which can be extruded, calendered, pressed, or rolled into film, sheet, strip, or web may be used. The polymer may be a single polymer or it may be a mixture of polymers. The polymers may be homopolymers, copolymers, random copolymers, block copolymers, graft copolymers, atactic polymers, isotactic polymers, syndiotactic polymers, linear polymers, or branched polymers. When mixtures of polymers are used, the mixture may be homogeneous or it may comprise two or more polymeric phases. Examples of classes of suitable substantially water-insoluble thermoplastic organic polymers include the thermoplastic polyolefins, poly(halo-substituted olefins), polyesters, polyamides, polyurethanes, polyureas, poly (vinyl halides), poly(vinylidene halides), polystyrenes, poly (vinyl esters), polycarbonates, polyethers, polysulfides, polyimides, polysilanes, polysiloxanes, polycaprolactones, polyacrylates, and polymethacrylates. Hybrid classes exemplified by the thermoplastic poly(urethane-ureas), poly (ester-amides), poly(silane-siloxanes), and poly(ether-esters) are within contemplation. Examples of suitable substantially water-insoluble thermoplastic organic polymers include thermoplastic high density polyethylene, low density polyethylene, ultrahigh molecular weight polyethylene, polypropylene (atactic, isotactic, or syndiotatic as the case may be), poly(vinyl chloride), polytetrafluoroethylene, poly(vinylidene chloride), copolymers of vinylidene chloride and vinyl acetate, copolymers of vinylidene chloride and vinyl chloride, copolymers of ethylene and propylene, copolymers of ethylene and butene, poly(vinyl acetate), polystyrene, poly(omega-aminoundecanoic acid) poly(hexamethylene adipamide), poly(epsilon-caprolactam), and poly(methyl methacrylate). These listings are by no means exhaustive, but are intended for purposes of illustration. The preferred substantially water-insoluble thermoplastic organic polymers comprise poly(vinyl chloride), copolymers of vinyl chloride, or mixtures thereof; or they comprise substantially linear ultrahigh molecular weight polyolefin which is substantially linear ultrahigh molecular weight polyethylene having an intrinsic viscosity of at least 10 deciliters/gram, substantially linear ultrahigh molecular weight polypropylene having an intrinsic viscosity of at least 6 deciliters/gram, or a mixture thereof. Substantially linear ultrahigh molecular weight polyethylene having an intrinsic viscosity of at least 18 deciliters/gram is especially preferred.

Inasmuch as ultrahigh molecular weight (UHMW) polyolefin is not a thermoset polymer having an infinite molecular weight, it is technically classified as a thermoplastic. However, because the molecules are substantially very long chains, UHMW polyolefin, and especially UHMW polyethylene, softens when heated but does not flow as a molten liquid in a normal thermoplastic manner. The very long chains and the peculiar properties they provide to UHMW polyolefin are believed to contribute in large measure to the desirable properties of microporous materials made using this polymer.

As indicated earlier, the intrinsic viscosity of the UHMW polyethylene is at least 10 deciliters/gram. Usually the intrinsic viscosity is at least 14 deciliters/gram. Often the intrinsic viscosity is at least 18 deciliters/gram. In many cases the intrinsic viscosity is at least 19 deciliters/gram. Although there is no particular restriction on the upper limit of the intrinsic viscosity, the intrinsic viscosity is frequently in the range of from 10 to 39 deciliters/gram. The intrinsic viscosity is often in the range of from 14 to 39 deciliters/gram. In most cases the intrinsic viscosity is in the range of from 18 to 39 deciliters/gram. An intrinsic viscosity in the range of from 18 to 32 deciliters/gram is preferred.

Also as indicated earlier the intrinsic viscosity of the UHMW polypropylene is at least 6 deciliters/gram. In many cases the intrinsic viscosity is at least 7 deciliters/gram. Although there is no particular restriction on the upper limit of the intrinsic viscosity, the intrinsic viscosity is often in the range of from 6 to 18 deciliters/gram. An intrinsic viscosity in the range of from 7 to 16 deciliters/gram is preferred.

As used herein and in the claims, intrinsic viscosity is determined by extrapolating to zero concentration the reduced viscosities or the inherent viscosities of several dilute solutions of the UHMW polyolefin where the solvent is freshly distilled decahydronaphthalene to which 0.2 percent by weight, 3,5-di-tert-butyl-4-hydroxyhydrocinnamic acid, neopentanetetrayl ester [CAS Registry No. 6683-19-8] has been added. The reduced viscosities or the inherent viscosities of the UHMW polyolefin are ascertained from relative viscosities obtained at 135° C. using an Ubbelohde No. 1 viscometer in accordance with the general procedures of ASTM D 4020-81, except that several dilute solutions of differing concentration are employed.

The nominal molecular weight of UHMW polyethylene is empirically related to the intrinsic viscosity of the polymer according to the equation:

$$M=5.37\times10^4[\eta]^{1.37}$$

where M is the nominal molecular weight and $[\eta]$ is the intrinsic viscosity of the UHMW polyethylene expressed in deciliters/gram. Similarly, the nominal molecular weight of UHMW polypropylene is empirically related to the intrinsic viscosity of the polymer according to the equation:

$$M=8.88\times10^4[\eta]^{1.25}$$

where M is the nominal molecular weight and $[\eta]$ is the intrinsic viscosity of the UHMW polypropylene expressed in deciliters/gram.

The substantially linear ultrahigh molecular weight polypropylene is most frequently substantially linear ultrahigh molecular weight isotactic polypropylene. Often the degree of isotacicity of such polymer is at least 95 percent, while preferably it is at least 98 percent.

When used, sufficient UHMW polyolefin should be present in the matrix to provide its properties to the microporous material. Other thermoplastic organic polymer may also be present in the matrix so long as its presence does not materially affect the properties of the microporous material in an adverse manner. The amount of the other thermoplastic polymer which may be present depends upon the nature of such polymer. In general, a greater amount of other thermoplastic organic polymer may be used if the molecular structure contains little branching, few long sidechains, and few bulky side groups, than when there is a large amount of branching, many long sidechains, or many bulky side groups. For this reason, the preferred other thermoplastic organic polymers which may optionally be present are low density polyethylene, high density polyethylene, poly(tetrafluoroethylene), and polypropylene. It is our experience that usually at least about one percent UHMW polyolefin, based on the weight of the matrix, will provide the desired properties to the microporous material. At least 3 percent UHMW polyolefin by weight of the matrix is commonly used. In many cases at least 10 percent by weight of the matrix is UHMW polyolefin. Frequently at least 50 percent by weight of the matrix is UHMW polyolefin. In many instances at least 60 percent by weight of the matrix is UHMW polyolefin. Sometimes at least 70 percent by weight of the matrix is UHMW polyolefin. In some cases the other thermoplastic organic polymer is substantially absent.

In a preferred embodiment the matrix comprises a mixture of substantially linear ultrahigh molecular weight polyethylene having an intrinsic viscosity of at least 10 deciliters/gram and lower molecular weight polyethylene having an ASTM D 1238-86 Condition E melt index of less than 50 grams/10 minutes and an ASTM D 1238-86 Condition F melt index of at least 0.1 gram/10 minutes. The nominal molecular weight of the lower molecular weight polyethylene (LMWPE) is lower than that of the UHMW polyethylene. LMWPE is thermoplastic and many different types are known. One method of classification is by density, expressed in grams/cubic centimeter and rounded to the nearest thousandth, in accordance with ASTM D 1248-84 (Reapproved 1989):

TABLE 1

| Type | Abbreviation | Density, g/cm³ |
| --- | --- | --- |
| Low Density Polyethylene | LDPE | 0.910–0.925 |
| Medium Density Polyethylene | MDPE | 0.926–0.940 |
| High Density Polyethylene | HDPE | 0.941–0.965 |

Any or all of these polyethylenes may be used as the LMWPE in the present invention. HDPE, however, is preferred because it ordinarily tends to be more linear than MDPE or LDPE.

The ASTM D 1238-86 Condition E (that is, 190° C. and 2.16 kilogram load) melt index of the LMWPE is less than 50 grams/10 minutes. Often the Condition E melt index is less than 25 grams/10 minutes. Preferably the Condition E melt index is less than 15 grams/10 minutes.

The ASTM D 1238-86 Condition F (that is, 190° C. and 21.6 kilogram load) melt index of the LMWPE is at least 0.1 gram/10 minutes. In many cases the Condition F melt index is at least 0.5 gram/10 minutes. Preferably the Condition F melt index is at least 1.0 gram/10 minutes.

It is especially preferred that the UHMW polyethylene constitute at least one percent by weight of the matrix and that the UHMW polyethylene and the LMWPE together constitute substantially 100 percent by weight of the polymer of the matrix.

Although both are silicas, it is important to distinguish precipitated silica from silica gel inasmuch as these different materials have different properties. Reference in this regard is made to R. K. Iler, *The Chemistry of Silica*, John Wiley & Sons, New York (1979), Library of Congress Catalog No. QD 181.S6144. Note especially pages 15–29, 172–176, 218–233, 364–365, 462–465, 554–564, and 578–579. Silica gel is usually produced commercially at low pH by acidifying an aqueous solution of a soluble metal silicate, typically sodium silicate, with acid. The acid employed is generally a strong mineral acid such as sulfuric acid or hydrochloric acid although carbon dioxide is sometimes used. Inasmuch as there is substantially no difference in density between the gel phase and the surrounding liquid phase while the viscosity is low, the gel phase does not settle out, that is to say, it does not precipitate. Silica gel, then, may be described as a nonprecipitated, coherent, rigid, three-dimensional network of contiguous particles of colloidal amorphous silica. The state of subdivision ranges from large, solid masses to submicroscopic particles, and the degree of hydration from almost anhydrous silica to soft gelatinous masses containing on the order of 100 parts of water per part of silica by weight, although the highly hydrated forms are only rarely used in the present invention.

Precipitated silica is usually produced commercially by combining an aqueous solution of a soluble metal silicate, ordinarily alkali metal silicate such as sodium silicate or potassium silicate, and an acid so that colloidal particles will grow in weakly alkaline solution and be coagulated by the alkali metal ions of the resulting soluble alkali metal salt. Various acids may be used, including the mineral acids and carbon dioxide. In the absence of a coagulant, silica is not precipitated from solution at any pH. The coagulant used to effect precipitation may be the soluble alkali metal salt produced during formation of the colloidal silica particles, it may be added electrolyte such as a soluble inorganic or organic salt, or it may be a combination of both.

Precipitated silica, then, may be described as precipitated aggregates of ultimate particles of colloidal amorphous silica that have not at any point existed as macroscopic gel during the preparation. The sizes of the aggregates and the degree of hydration may vary widely.

Precipitated silica powders differ from silica gels that have been pulverized in ordinarily having a more open structure, that is, a higher specific pore volume. However, the specific surface area of precipitated silica as measured by the Brunauer, Emmet, Teller (BET) method using nitrogen as the adsorbate, is often lower than that of silica gel.

Amorphous precipitated silica is usually obtained by precipitation from an aqueous solution of alkali metal silicate such as sodium silicate or potassium silicate using a suitable acid such as sulfuric acid, hydrochloric acid, or carbon dioxide. Following precipitation, the precipitated silica is usually washed and then dried. Exemplary processes for producing conventional amorphous precipitated silicas are described in detail in U.S. Pat. Nos. 2,657,149; 2,940,830; 4,681,750 and 5,094,829. The amorphous precipitated silica employed in the present invention can be prepared by washing the precipitated silica after precipitation in the conventional manner and drying.

As present in the microporous material, the amorphous precipitated silica particles may be in the form of ultimate particles, aggregates of ultimate particles, or a combination of both. The size and distribution of sizes of aggregates of a particular precipitated silica will depend on the process of drying and the degree of milling, if any, given to the dried silica. In most cases, at least 90 percent by weight of the amorphous precipitated silica particles used in preparing the microporous material have gross particle sizes in the range of from 5 to 150 micrometers as determined by use of a Model TAII Coulter counter (Coulter Electronics, Inc.) according to ASTM C 690-80 but modified by stirring the filler for 10 minutes in Isoton II electrolyte (Curtin Matheson Scientific, Inc.) using a four-blade, 4.445 centimeter diameter propeller stirrer. Often at least 90 percent by weight of the amorphous precipitated silica particles have gross particle sizes in the range of from 5 to 100 micrometers. Preferably at least 90 percent by weight of the amorphous precipitated silica particles have gross particle sizes in the range of from 5 to 40 micrometers. It is expected that the sizes of amorphous precipitated silica agglomerates may be reduced during processing of the ingredients to prepare the microporous material. Accordingly, the distribution of gross particle sizes in the microporous material may be smaller than in the raw amorphous precipitated silica particles themselves.

The average ultimate particle size of the amorphous precipitated silica (irrespective of whether or not the ultimate particles are agglomerated) is usually less than 0.1 micrometer as determined by transmission electron microscopy. Often the average ultimate particle size is less than 0.05 micrometer. Preferably the average ultimate particle size of the precipitated silica is less than 0.03 micrometer.

In most instances the amorphous precipitated silica particles constitute all of the finely divided substantially water-insoluble filler particles of the microporous material. Other finely divided substantially water-insoluble filler particles, however, may also be employed. Amorphous precipitated silica particles constitute at least 50 percent by weight of the finely divided substantially water-insoluble filler particles. In many cases amorphous precipitated silica particles constitute at least 65 percent by weight of the finely divided substantially water-insoluble filler particles. Often amorphous precipitated silica particles constitute at least 75 percent by weight of the finely divided substantially water-insoluble filler particles. Frequently amorphous precipitated silica particles constitute at least 85 percent by weight of the finely divided substantially water-insoluble filler particles. Usually all of the finely divided substantially water-insoluble filler particles are amorphous precipitated silica particles.

Examples of other finely divided substantially water-insoluble filler particles that can be used in addition to the amorphous precipitated silica particles include other siliceous particles such as particles of quartz, silica gel, fumed silica, mica, montmorillonite, kaolinite, asbestos, talc, diatomaceous earth, vermiculite, natural and synthetic zeolites, cement, calcium silicate, aluminum silicate, aluminum polysilicate, alumina silica gels, and glass particles. Other examples include particles of finely divided substantially water-insoluble non-siliceous filler particles such as particles of titanium oxide, iron oxide, copper oxide, zinc oxide, antimony oxide, zirconia, magnesia, alumina, molybdenum disulfide, zinc sulfide, barium sulfate, strontium sulfate, calcium carbonate, magnesium carbonate, magnesium hydroxide, and finely divided substantially water-insoluble flame retardant filler particles such as particles of ethylenebis(tetra-bromophthalimide), octabromodiphenyl oxide, decabromodiphenyl oxide, and ethylenebisdibromonorbornane dicarboximide.

The finely divided substantially water-insoluble filler particles constitute from 40 to 90 percent by weight of the microporous material. Frequently such filler particles constitute from 40 to 85 percent by weight of the microporous material. Often the finely divided substantially water-insoluble filler particles constitute from 50 to 90 percent by weight of the microporous material. In many cases the finely divided substantially water-insoluble filler particles constitute from 50 to 85 percent by weight of the microporous material. From 55 percent to 80 percent by weight is preferred.

Minor amounts, usually less than 5 percent by weight, of other materials used in processing such as lubricant, processing plasticizer, organic extraction liquid, water, and the like, may optionally also be present. Yet other materials introduced for particular purposes may optionally be present in the microporous material in small amounts, usually less than 15 percent by weight. Examples of such materials include antioxidants, ultraviolet light absorbers, reinforcing fibers such as chopped glass fiber strand, dyes, pigments, and the like. Materials exemplified by the foregoing types may collectively be regarded as additives. The balance of the microporous material, exclusive of filler and any coating, printing ink, or impregnant applied for one or more special purposes is substantially the thermoplastic organic polymer.

Many processes are known for producing the microporous materials which may be employed in the present invention. Such processes are exemplified by those described in the patents, patent application, and international patent publication earlier referenced.

Preferably filler particles, thermoplastic organic polymer powder, processing plasticizer and minor amounts of lubricant and antioxidant are mixed until a substantially uniform mixture is obtained. The weight ratio of filler to polymer employed in forming the mixture is substantially the same as that of the microporous material to be produced. The mixture, together with additional processing plasticizer, is introduced to the heated barrel of a screw extruder. Attached to the extruder is a sheeting die. A continuous sheet formed by the die is forwarded without drawing to a pair of heated calender rolls acting cooperatively to form continuous sheet of lesser thickness than the continuous sheet exiting from the die. The continuous sheet from the calender then passes to a first extraction zone where the processing plasticizer is substantially removed by extraction with an organic liquid which is a good solvent for the processing plasticizer, a poor solvent for the organic polymer, and more volatile than the processing plasticizer. Usually, but not necessarily, both the processing plasticizer and the organic extraction liquid are substantially immiscible with water. The continuous sheet then passes to a second extraction zone where the residual organic extraction liquid is substantially removed by steam and/or water. The continuous sheet is then passed through a forced air dryer for substantial removal of residual water and remaining residual organic extraction liquid. From the dryer the continuous sheet, which is microporous material, is passed to a take-up roll.

The processing plasticizer has little solvating effect on the thermoplastic organic polymer at 60° C., only a moderate solvating effect at elevated temperatures on the order of 100° C., and a significant solvating effect at elevated temperatures on the order of 200° C. It is a liquid at room temperature and usually it is processing oil such as paraffinic oil, naphthenic oil, or aromatic oil. Suitable processing oils include those meeting the requirements of ASTM D 2226-82, Types 103 and 104. Preferred are oils which have a pour point of less than 22° C. according to ASTM D 97-66 (reapproved 1978). Particularly preferred are oils having a pour point of less than 10° C. Examples of suitable oils include Shellflex® 412 and Shellflex® 371 oil (Shell Oil Co.) which are solvent refined and hydrotreated oils derived from naphthenic crude. Further examples of suitable oils include ARCOprime® 400 oil (Atlantic Richfield Co.) and Kaydol® oil (Witco Corp.) which are white mineral oils. It is expected that other materials, including the phthalate ester plasticizers such as dibutyl phthalate, bis(2-ethylhexyl) phthalate, diisodecyl phthalate, dicyclohexyl phthalate, butyl benzyl phthalate, and ditridecyl phthalate will function satisfactorily as processing plasticizers.

There are many organic extraction liquids that can be used. Examples of suitable organic extraction liquids include 1,1,2-trichloroethylene, perchloroethylene, 1,2-dichloroethane, 1,1,1-trichloroethane, 1,1,2-trichloroethane, methylene chloride, chloroform, 1,1,2-trichloro-1,2,2-trifluoroethane, isopropyl alcohol, diethyl ether, acetone, hexane, heptane, and toluene.

In the above described process for producing microporous material, extrusion and calendering are facilitated when the substantially water-insoluble filler particles carry much of the processing plasticizer. The capacity of the filler particles to absorb and hold the processing plasticizer is a function of the surface area of the filler. It is therefore preferred that the filler have a high surface area. High surface area fillers are materials of very small particle size, materials having a high degree of porosity or materials exhibiting both characteristics. Usually the surface area of at least the siliceous filler particles is in the range of from 20 to 400 square meters per gram as determined by the Brunauer, Emmett, Teller (BET) method according to ASTM C 819-77 using nitrogen as the adsorbate but modified by outgassing the system and the sample for one hour at 130° C. Preferably the surface area is in the range of from 25 to 350 square meters per gram. Preferably, but not necessarily, the surface area of any non-siliceous filler particles used is also in at least one of these ranges.

Inasmuch as it is desirable to substantially retain the filler in the microporous material, it is preferred that the substantially water-insoluble filler particles be substantially insoluble in the processing plasticizer and substantially insoluble in the organic extraction liquid when microporous material is produced by the above process.

The residual processing plasticizer content is usually less than 10 percent by weight of the microporous sheet and this may be reduced even further by additional extractions using the same or a different organic extraction liquid. Often the residual processing plasticizer content is less than 5 percent by weight of the microporous sheet and this may be reduced even further by additional extractions.

On a coating-free, printing ink free, impregnant-free, and pre-bonding basis, pores constitute from 35 to 80 percent by volume of the microporous material. In many cases the pores constitute from 60 to 75 percent by volume of the microporous material. As used herein and in the claims, the porosity (also known as void volume) of the microporous material, expressed as percent by volume, is determined according to the equation:

$$\text{Porosity} = 100[1 - d_1/d_2]$$

where $d_1$ is the density of the sample which is determined from the sample weight and the sample volume as ascertained from measurements of the sample dimensions and $d_2$ is the density of the solid portion of the sample which is determined from the sample weight and the volume of the solid portion of the sample. The volume of the solid portion of the same is determined using a Quantachrome stereopycnometer (Quantachrome Corp.) in accordance with the accompanying operating manual.

The volume average diameter of the pores of the microporous material is determined by mercury porosimetry using an Autoscan mercury porosimeter (Quantachrome Corp.) in accordance with the accompanying operating manual. The volume average pore radius for a single scan is automatically determined by the porosimeter. In operating the porosimeter, a scan is made in the high pressure range (from about 138 kilopascals absolute to about 227 megapascals absolute). If about 2 percent or less of the total intruded volume occurs at the low end (from about 138 to about 250 kilopascals absolute) of the high pressure range, the volume average pore diameter is taken as twice the volume average pore radius determined by the porosimeter. Otherwise, an additional scan is made in the low pressure range (from about 7 to about 165 kilopascals absolute) and the volume average pore diameter is calculated according to the equation:

$$d = 2\left[\frac{v_1 r_1}{w_1} + \frac{v_2 r_2}{w_2}\right] / \left[\frac{v_1}{w_1} + \frac{v_2}{w_2}\right]$$

where d is the volume average pore diameter, $v_1$ is the total volume of mercury intruded in the high pressure range, $v_2$ is the total volume of mercury intruded in the low pressure range, $r_1$ is the volume average pore radius determined from the high pressure scan, $r_2$ is the volume average pore radius determined from the low pressure scan, $w_1$ is the weight of the sample subjected to the high pressure scan, and $w_2$ is the weight of the sample subjected to the low pressure scan. Generally on a coating-free, printing ink-free, impregnant-free, and pre-bonding basis the volume average diameter of the pores is in the range of from 0.02 to 0.5 micrometer. Very often the volume average diameter of the pores is in the range of from 0.04 to 0.3 micrometer. From 0.05 to 0.25 micrometer is preferred.

In the course of determining the volume average pore diameter by the above procedure, the maximum pore radius detected is sometimes noted. This is taken from the low pressure range scan if run; otherwise it is taken from the high pressure range scan. The maximum pore diameter is twice the maximum pore radius.

Inasmuch as some coating processes, printing processes, impregnation processes and bonding processes result in filling at least some of the pores of the microporous material and since some of these processes irreversibly compress the microporous material, the parameters in respect of porosity, volume average diameter of the pores, and maximum pore diameter are determined for the microporous material prior to application of one or more of these processes.

The microporous material produced by the above-described processes may optionally be stretched. It will be appreciated that the stretching both increases the void volume of the material and induces regions of molecular orientation. As is well known in the art, many of the physical properties of molecularly oriented thermoplastic organic polymer, including tensile strength, tensile modulus, Young's modulus, and others, differ considerably from those of the corresponding thermoplastic organic polymer having little or no molecular orientation.

Stretching may be accomplished in a single step or a plurality of steps as desired. For example, when the microporous material is to be stretched in a single direction (uniaxial stretching), the stretching may be accomplished by a single stretching step or a sequence of stretching steps until the desired final stretch ratio is attained. Similarly, when the microporous material is to be stretched in two directions (biaxial stretching), the stretching can be conducted by a single biaxial stretching step or a sequence of biaxial stretching steps until the desired final stretch ratios are attained. Biaxial stretching may also be accomplished by a sequence of one of more uniaxial stretching steps in one direction and one or more uniaxial stretching steps in another direction. Biaxial stretching steps where the microporous material is stretched simultaneously in two directions and uniaxial stretching steps may be conducted in sequence in any order. Stretching in more than two directions is within contemplation. It may be seen that the various permutations of steps are quite numerous. Other steps, such as cooling, heating, sintering, annealing, reeling, unreeling, and the like, may optionally be included in the overall process as desired.

Stretched microporous material may be produced by stretching the unstretched microporous material in at least one stretching direction above the elastic limit. Usually the stretch ratio is at least 1.5. In many cases the stretch ratio is at least 1.7. Preferably it is at least 2. Frequently the stretch ratio is in the range of from 1.5 to 15. Often the stretch ratio is in the range of from 1.7 to 10. Preferably the stretch ratio is in the range of from 2 to 6. As used herein, the stretch ratio is determined by the formula:

$$S = L_2/L_1$$

where S is the stretch ratio, $L_1$ is the distance between two reference points located on the unstretched microporous material and on a line parallel to the stretching direction, and $L_2$ is the distance between the same two reference points located on the stretched microporous material.

The temperatures at which stretching is accomplished may vary widely. Stretching may be accomplished at ambient room temperature, but usually elevated temperatures are employed. In most cases, the film surface temperatures during stretching are in the range of from 20° C. to 220° C. Often such temperatures are in the range of from 50° C. to 200° C. From 75° C. to 180° C. is preferred.

Various types of stretching apparatus are well known and may be used to accomplish stretching of the microporous material.

After stretching has been accomplished, the microporous material may optionally be sintered, annealed, heat set and/or otherwise heat treated. During these optional steps, the stretched microporous material is usually held under tension so that it will not markedly shrink at the elevated temperatures employed, although some relaxation amounting to a small fraction of the maximum stretch ratio is frequently permitted.

Following stretching and any heat treatments employed, tension is released from the stretched microporous material after the microporous material has been brought to a temperature at which, except for a small amount of elastic recovery amounting to a small fraction of the stretch ratio, it is substantially dimensionally stable in the absence of tension. Elastic recovery under these conditions usually does not amount to more than 10 percent of the stretch ratio.

Stretching is preferably accomplished after substantial removal of the processing plasticizer as described above. For purposes of this invention, however, the calendered sheet may be stretched in at least one stretching direction followed by substantial removal of the residual organic extraction liquid. It will be appreciated that as stretching may be accomplished in a single step or a plurality of steps, so likewise extraction of the processing plasticizer may be accomplished in a single step or a plurality of steps and removal of the residual organic extraction liquid may be accomplished in a single step or a plurality of steps. The various combinations of the steps stretching, partial stretching, processing plasticizer extraction, partial plasticizer extraction, removal of organic extraction liquid, and partial removal of organic extraction liquid are very numerous, and may be accomplished in any order, provided of course, that a step of processing plasticizer extraction (partial or substantially complete) precedes the first step of residual organic extraction liquid removal (partial or substantially complete). It is expected that varying the orders and numbers of these steps will produce variations in a least some of the physical properties of the stretched microporous product.

In all cases, the porosity of the stretched microporous material is, unless coated, printed, impregnated, or bonded after stretching, greater than that of the unstretched microporous material. On a coating-free, printing ink-free, impregnant-free, and pre-bonding basis, pores usually constitute more than 80 percent by volume of the stretched microporous material. In many instances the pores constitute at least 85 percent by volume of the stretched microporous material. Often the pores constitute from more than 80 percent to 95 percent by volume of the stretched microporous material. From 85 percent to 95 percent by volume is preferred.

Generally on a coating-free, printing ink-free, impregnant-free, and pre-bonding basis the volume average diameter of the pores of the stretched microporous material is in the range of from 0.6 to 50 micrometers. Very often the volume average diameter of the pores is in the range of from 1 to 40 micrometers. From 2 to 30 micrometers is preferred.

Very thin microporous material may be produced by the blown film process. The blown film process itself and the apparatus used in the blown film process, are both well known for producing polyolefin films. According to the known process, polymer composition is introduced to an extruder which heats, mixes, and extrudes the composition through an annular opening of a blown film die of conventional construction to form a polymer tube. When desired, one or more other extruders may feed the same or different polymer to the same blown film die so as to provide a multilayer polymer tube issuing from the final annular opening of the die. Blown film dies which can form 2, 3, 4, 5, or more layers are known and are commercially available. The polymer tube, whether monolayer or multilayer, exits the die in a vertical direction. Simultaneously, air or other gas is blown on the inside of the polymer tube to expand the tube into a tubular membrane bubble having a larger diameter than that of the tube exiting the extrusion die. This is referred to as stretching in the transverse direction, TD. The tubular membrane bubble is directed by guides to nip rolls which collapse the bubble thereby producing a collapsed membrane tube. In most instances the nip rolls are rotated at such a speed that the tubular membrane bubble is also stretched longitudinally along its axis. This is referred to as stretching in the machine direction, MD. When necessary or desirable, cooling air is blown at one or more locations on the outside and/or inside the extruded tube and/or the membrane bubble. The collapsed tube is usually either wound on mandrels or slit longitudinally to form flat films which are wound on mandrels.

The well known blown film process may be adapted to produce very thin microporous material by introducing the appropriate composition(s) comprising polymer, filler, and processing plasticizer to one or more extruders which discharge to the blown film die, and by adjusting the stretching ratios so as to obtain a very thin microporous material product.

Prior to printing, the surface of the microporous material substrate which has not been coated with the coating composition of the invention or which is not to be coated with the coating composition of the invention may be laminated to another material which may be porous or substantially nonporous.

After the coated microporous material of the invention has been printed on the coating, the printed coating may optionally be laminated to another material or coated.

The other material or the coating, as the case my be, is usually, but not necessarily, substantially transparent. It may be substantially colorless, it may be highly colored, or it may be of an intermediate degree of color. Usually the coating is substantially transparent and substantially colorless. As used herein and in the claims, a coating is substantially transparent if its luminous transmission in the visible region is at least 80 percent of the incident light. Often the luminous transmission of the coating is at least 85 percent of the incident light. Preferably the luminous transmission of the coating is at least 90 percent. Also as used herein and in the claims, a coating is substantially colorless if the luminous transmission is substantially the same for all wavelengths in the visible region, viz., 400 to 800 nanometers.

Optionally the above-described coatings may be overlaid with an overcoating comprising ink-receptive organic film-forming polymer. The overcoating may be formed by applying an overcoating composition comprising a liquid medium and ink-receptive organic film-forming polymer dissolved or dispersed in the liquid medium and removing the liquid medium, as for example, by drying. Preferably the liquid medium is an aqueous solvent and the ink-receptive organic film-forming polymer is water-soluble poly(ethylene oxide) having a weight average molecular weight in the range of from 100,000 to 3,000,000, both of which have been described above in respect of earlier described embodiments of the invention. Water is an especially preferred aqueous solvent.

The relative proportions of liquid medium and organic film-forming polymer present in the overcoating composition may vary widely. The minimum proportion is that which will produce an overcoating composition having a viscosity low enough to apply as an overcoating. The maximum proportion is not governed by any theory, but by practical considerations such as the cost of the liquid medium and the cost and time required to remove the liquid medium from the applied wet overcoating. Usually, however, the weight ratio of liquid medium to film-forming organic polymer is from 18:1 to 50:1. Often the weight ratio is from 19:1 to 40:1. Preferably weight ratio is from 19:1 to 24:1.

Optional ingredients such as those discussed above may be present in the overcoating composition when desired.

The overcoating composition may be prepared by admixing the ingredients. It may be applied and dried using any of the coating and drying techniques discussed above. When an overcoating composition is to be applied, it may be applied once or a multiplicity of times.

For purposes of the present invention, lamination peel strength is determined in accordance with the following protocol: Each test sample is prepared by cutting a sheet measuring 21.6 centimeters (cm)×27.9 cm from the coated or uncoated, as the case may be, microporous material to be tested, such that the 27.9 cm dimension of the sheet is aligned parallel to the machine direction of the microporous material. An assembly is formed by stacking the following materials in the following order: (1) a 21.6 cm×27.9 cm sheet of Sealtran® 3/2 KRTY laminating film [poly(ethylene terephthalate (PET) film having a thickness of about 0.076 millimeters (mm) coated on one side with KRTY adhesive having a thickness of about 0.051 mm; Transilwrap Company, Inc., Chicago, Ill., U.S.A.] with the adhesive side up; (2) a 21.6 cm×27.9 cm test specimen with the coating, if any, up; (3) a 5.1 cm×27.9 cm strip of 20-pound (9.1-kilogram) bond paper; and (4) a 21.6 cm×27.9 cm sheet of Sealtran® 3/2 KRTY laminating film with the adhesive side down. The centerlines parallel to the 27.9 cm dimensions of the four layers are superimposed. A sheet of heavy paper stock bearing a silicone resin coating on one side is folded in half to form a laminating folder with the silicone resin coating inside. The laminating folder is large enough to completely contain the assembly. The assembly is placed in the laminating folder. A laminate is formed by feeding the laminating folder containing the assembly through a Transilwrap Model 6000 pocket laminator while the roll temperatures are in the range of from 120° C. to 135° C. The laminate is removed from the laminating folder. All laminates are stored at room temperature for at least 24 hours prior to peel testing. A 21.6 cm×27.9 cm laminate sample is cut to form two halves each measuring 10.8 cm×27.9 cm. Using a JDC Precision Sample Cutter (Thwing Albert Instrument Co. Philadelphia, Pa., U.S.A.), the halves are cut parallel to the 10.8 cm dimension into specimens measuring 2.54 cm×10.8 cm. The paper-PET composite is separated from the microporous material-PET composite to form two tabs. The paper-PET tab is placed in one jaw of an Instron® Model 1011 tabletop tester (Instron Corporation Canton, Mass., U.S.A.) which is under the control of a computer running Instron® Series IX software. The microporous material-PET tab is placed in the other jaw of the tester. A 180° peel is performed at a peeling rate of 1.27 cm/minute with four peel force measurements being taken per second. After the jaws have separated at least 25 mm and often 50 mm, and the load is substantially stable, the test is stopped. Data for averaging is selected by cursor control using the Series IX software. The initial portion of the data which usually contains a peak for peel initiation is discarded. The final portion of the data which may contain end effects due to the edges of the initial laminated sample is also discarded. The remaining data points which represent values taken over at least 15 mm of crosshead travel are then averaged by the software. This average value is taken as the peel strength of the specimen.

The lamination peel strengths of the printing media of the present invention may vary widely. Usually the peel strength is at least 875 newtons/meter. Often the peel strength is at least 1050 newtons/meter. Preferably the peel strength is at least 1225 newtons/meter. In most instances the peel strength is in the range of from 875 to 3190 newtons/meter. Often the peel strength is in the range of from 1050 to 2630 newtons/meter. Frequently the peel strength is in the range of from 1225 to 2100 newtons/meter is preferred.

Other than in the operating examples, or where otherwise indicated, all numbers expressing quantities of ingredients or reaction conditions used herein are to be understood as modified in all instances by the term "about".

The invention is further described in conjunction with the following examples which are to be considered illustrative rather than limiting, and in which all parts are parts by weight and all percentages are percentages by weight unless otherwise specified.

EXAMPLE 1

A poly(ethylene oxide) (PEO) solution was formed by dissolving 180 grams poly(ethylene oxide) having a weight average molecular weight of about 400,000 in 2820 grams of deionized water. The mixture was stirred until all poly (ethylene oxide) was dissolved giving a composition containing 6.0 percent solids.

To 116.6 grams of the above PEO solution were added 10.0 grams of POLY EMULSION 316N30 30 percent nonionic polyethylene sol (ChemCor Inc., Chester, N.Y.) and 7.5 grams of POLY EMULSION 43N40 40 percent nonionic maleated polypropylene sol (ChemCor Inc., Chester, N.Y.). To this mixture, 16.6 grams of DAOTAN VTW1265 36 percent acrylic-modified polyurethane dispersion (Vianova Resins, Charlotte, N.C.) were added with stirring to form a homogeneous coating composition.

The coating composition was applied to TESLIN® microporous sheets (PPG Industries Inc., Pittsburgh, Pa.) with a Meyer Rod #150 and the coated sheets were placed in a Werner Mathis forced air drying oven (Werner Mathis A.G., Zurich, Switzerland) for 3.5 minutes at 105° C. The dry coating was about 20 micrometers thick.

Dried coated TESLIN® microporous sheets were then printed on the coated side with Hewlett-Packard 850C, 890C, and 694C ink jet printers. In all cases, the ink jet printed sheets exhibited excellent image quality with high color fidelity.

EXAMPLE 2

To 116.6 grams of a polyethylene oxide) solution prepared as described in Example 1 were added 20.0 grams of LUDOX® AM-30 30 percent colloidal silica sol (Dupont Specialty Chemicals, Wilmington, Del.) and 16.6 grams of DAOTAN VTW1265 36 percent acrylic-modified polyurethane dispersion. Next, the mixture was stirred to form a homogeneous coating composition.

The coating composition was applied to TESLIN® microporous sheets with a Meyer Rod #150 and the coated sheets were placed in a Werner Mathis forced air drying oven for 3.5 minutes at 115° C. The dry coating was about 20 micrometers thick.

Dried coated TESLIN® microporous sheets were then printed on the coated side with Hewlett-Packard 850C, 890C, and 694C ink jet printers. In all cases, the ink jet printed sheets exhibited excellent image quality with high color fidelity.

EXAMPLE 3

To 116.6 grams of a poly(ethylene oxide) solution prepared as described in Example 1 were added 10.0 grams of POLY EMULSION 316N30 30 percent nonionic polyethylene and 7.5 grams of POLY EMULSION 43N40 40 percent nonionic maleated polypropylene (PP) sol. To this mixture, 16.6 grams of DAOTAN VTW1265 36 percent acrylic-modified polyurethane and 2.3 grams of LUVISKOL K-60 45 percent poly(vinylpyrrolidone) solution (BASF, Mount Olive, N.J.) were added with stirring to form a homogeneous coating composition.

The coating composition was applied to TESLIN® microporous sheets with a Meyer Rod #150 and the coated sheets were placed in a Werner Mathis forced air drying oven for 3.5 minutes at 115° C. The dry coating was about 20 micrometers thick.

Dried coated TESLIN® microporous sheets were then printed on the coated side with Hewlett-Packard 850C, 890C, and 694C ink jet printers. In all cases, the ink jet printed sheets exhibited excellent image quality with high color fidelity.

EXAMPLE 4

To 116.6 grams of a poly(ethylene oxide) solution prepared as described in Example 1 were added 10.0 grams of POLY EMULSION 316N30 30 percent nonionic polyethylene (PE) sol and 7.5 grams of POLY EMULSION 43N40 40 percent nonionic maleated polypropylene (PP) sol. To this mixture, 16.6 grams of DAOTAN VTW1265 36 percent acrylic-modified polyurethane dispersion and 3.3 grams of LUVISKOL K-60 45 percent poly(vinylpyrrolidone) solution were added with stirring to form a homogeneous coating composition.

The coating composition was applied to TESLIN® microporous sheets with a Meyer Rod #150 and the coated sheets were placed in a Werner Mathis forced air drying oven for 3.5 minutes at 115° C. The dry coating was about 20 micrometers thick.

Dried coated TESLIN® microporous sheets were then printed on the coated side with Hewlett-Packard 850C, 890C, and 694C ink jet printers. In all cases, the ink jet printed sheets exhibited excellent image quality with high color fidelity.

EXAMPLE 5

To 116.6 grams of a poly(ethylene oxide) solution prepared as described in Example 1 were added 10.0 grams of POLY EMULSION 316N30 30 percent nonionic polyethylene and 10.0 grams of POLY EMULSION 43C30 30 percent cationic maleated polypropylene. To this mixture, 16.6 grams of DAOTAN VTW1265 36 percent acrylic-modified polyurethane and 3.0 grams of a 33 percent aqueous solution of LUVISKOL K-30 poly(vinylpyrrolidone) were added with stirring to form a homogeneous coating composition.

The coating composition was applied to TESLIN® microporous sheets with a Meyer Rod #150 and the coated sheets were placed in a Werner Mathis forced air drying oven for 3.5 minutes at 115° C. The dry coating was about 20 micrometers thick.

Dried coated TESLIN® microporous sheets were then printed on the coated side with Hewlett-Packard 850C, 890C, and 694C ink jet printers. In all cases, the ink jet printed sheets exhibited excellent image quality with high color fidelity.

EXAMPLE 6

To 116.6 grams of a poly(ethylene oxide) solution prepared as described in Example 1 were added 10.0 grams of POLY EMULSION 316N30 30 percent nonionic polyethylene and 10.0 grams of POLY EMULSION 43C30 30 percent cationic maleated polypropylene. To this mixture, 16.6 grams of DAOTAN VTW1265 36 percent acrylic-modified polyurethane dispersion and 2.3 grams of LUSIVKOL K-60 45 percent polyvinylpyrrolidone solution were added with stirring to form a homogeneous coating composition.

The coating composition was applied to TESLIN® microporous sheets with a Meyer Rod #150 and the coated sheets were placed in a Werner Mathis forced air drying oven for 3.5 minutes at 115° C. The dry coating was about 20 micrometers thick.

Dried coated TESLIN® microporous sheets were then printed on the coated side with Hewlett-Packard 850C, 890C, and 694C ink jet printers. In all cases, the ink jet printed sheets exhibited excellent image quality with high color fidelity.

EXAMPLE 7

The coating composition described in Example 5 was applied to a TESLIN® microporous sheet, a PAPER-MATCH® sheet (A. O. Schulman, Akron, Ohio), and a NANYA® sheet (Nan Ya Plastics Corp., Taipei, Taiwan) with a Meyer Rod #150. The coated sheets were individually placed in a Werner Mathis forced air drying oven for 3.5 minutes at 115° C. The dry coating was about 20 micrometers thick in each case.

All dried coated sheets were printed on the coated side with a Hewlett-Packard 890C printer. In all cases, the ink jet printed sheets exhibited excellent image quality with high color fidelity. Next, a 180 degree lamination peel strength test was performed on each of the sheets. The listed peel strength values represent an average from both printed and unprinted regions on each sheet. The data, which are shown in Table 2, indicate a synergistic interaction between the coating and the TESLIN® microporous sheet such that superior lamination peel strength values are obtained.

TABLE 2

| Substrate | Lamination Peel Strength, newtons/meter |
| --- | --- |
| TESLIN ® Microporous Sheet | 1051 |
| PAPERMATCH ® Sheet | <175 |
| NANYA ® Sheet | <175 |

EXAMPLE 8

The coating composition described in Example 5 was applied to a TESLIN® microporous sheet with a Meyer Rod #40. The coated sheet was placed in a Werner Mathis forced air drying oven for 3.5 minutes at 115° C. The dry coating was about 10 micrometers thick.

The dried coated sheet was printed on the coated side with a Hewlett-Packard 890C printer. The ink jet printed sheet exhibited excellent image quality with high color fidelity. Next, a 180 degree lamination peel strength test was performed on the sheet. The peel strength, which was an average from both printed and unprinted regions on the sheet, was 1278 newtons/meter.

EXAMPLE 9

To 53.3 grams of a poly(ethylene oxide) solution prepared as described in Example 1 were added 2.2 grams of a 36 percent acrylic-modified polyurethane dispersion (DAOTAN VTW1265; Vianova Resins, Charlotte, N.C.). Next, the mixture was stirred to form a homogeneous coating composition.

The coating composition was applied to a Teslin® sheet (PPG Industries Inc., Pittsburgh, Pa.) with a Meyer Rod #150 and then placed in a forced air drying oven (Werner Mathis A.G., Zurich, Switzerland) for 3.5 minutes at 105° C. The dry coating was about 20 micrometers thick.

The coated Teslin® sheet was then printed on the coated side with a Hewlett-Packard 890C ink jet printer. The printed sheet had good print quality and color fidelity.

EXAMPLE 10

To 40.0 grams of a poly(ethylene oxide) solution prepared as described in Example 1 were added 26.7 grams of a 36 percent acrylic-modified polyurethane dispersion (DAOTAN VTW1265; Vianova Resins, Charlotte, N.C.). Next, the mixture was stirred to form a homogeneous coating composition.

The coating composition was applied to a Teslin® sheet (PPG Industries Inc., Pittsburgh, Pa.) with a Meyer Rod

150 and then placed in a forced air drying oven (Werner Mathis A.G., Zurich, Switzerland) for 3.5 minutes at 105° C. The dry coating was about 20 micrometers thick.

The coated Teslin® sheet was then printed on the coated side with a Hewlett-Packard 890C ink jet printer. The printed sheet had good print quality and color fidelity.

Although the present invention has been described with reference to specific details of certain embodiments thereof, it is not intended that such details should be regarded as limitations upon the scope of the invention except insofar as they are included in the accompanying claims.

I claim:

1. A printing medium comprising a microporous material substrate having at least one surface and a coating on the surface, wherein the microporous material substrate on a coating-free, printing ink-free, and impregnant-free basis comprises:
   (a) a matrix consisting essentially of substantially water insoluble thermoplastic organic polymer,
   (b) finely divided substantially water-insoluble filler particles, of which at least 50 percent by weight are amorphous precipitated silica particles, the filler particles being distributed throughout the matrix and constituting from 40 to 90 percent by weight of the microporous material, and
   (c) a network of interconnecting pores communicating substantially throughout the microporous material, the pores constituting from 35 to 95 percent by volume of the microporous material;

and wherein the coating comprises binder which comprises organic polymer comprising:
   (d) poly(ethylene oxide) having a weight average molecular weight in the range of from 100,000 to 3,000,000; and
   (e) crosslinked urethane-acrylate hybrid polymer.

2. The printing medium of claim 1 wherein:
   (a) the poly(ethylene oxide) having a weight average molecular weight in the range of from 100,000 to 3,000,000 constitutes from 20 to 80 percent by weight of the organic polymer of the binder; and
   (b) the crosslinked urethane-acrylate hybrid polymer constitutes from 20 to 80 percent by weight of the organic polymer of the binder.

3. The printing medium of claim 1 wherein the organic polymer of the binder further comprises additional organic polymer.

4. The printing medium of claim 1 wherein the organic polymer of the binder constitutes from 20 to 100 percent by weight of the coating.

5. The printing medium of claim 1 which further comprises finely divided substantially water-insoluble filler particles.

6. The printing medium of claim 5 wherein the finely divided substantially water-insoluble filler particles have a maximum dimension of less than 500 nanometers.

7. The printing medium of claim 5 wherein the finely divided substantially water-insoluble filler particles have a maximum dimension of less than 100 nanometers.

8. The printing medium of claim 5 wherein the finely divided substantially water-insoluble filler particles have a maximum dimension of less than 50 nanometers.

9. The printing medium of claim 5 wherein the finely divided filler particles constitute from 20 to 60 percent by weight of the coating.

10. The printing medium of claim 1 having a peel strength of at least 875 newtons/meter.

11. The printing medium of claim 1 having a peel strength of at least 1050 newtons/meter.

12. The printing medium of claim 1 having a peel strength of at least 1225 newtons/meter.

13. The printing medium of claim 1 having a peel strength in the range of from 875 to 3190 newtons/meter.

14. The printing medium of claim 1 having a peel strength in the range of from 1050 to 2630 newtons/meter.

15. The printing medium of claim 1 having a peel strength in the range of from 1225 to 2100 newtons/meter.

16. The printing medium of claim 1 wherein the coating is substantially nonporous.

17. The printing medium of claim 1 wherein the coating is porous.

18. A printing process which comprises applying liquid ink droplets to the printing medium of claim 1.

* * * * *